(12) United States Patent
Kunjukrishnan

(10) Patent No.: US 11,922,365 B1
(45) Date of Patent: Mar. 5, 2024

(54) SMART-SHIPPING CONTAINER WITH SECURITY AND COMMUNICATIONS CAPABILITIES

(71) Applicant: T-Mobile USA, Inc., Bellevue, WA (US)

(72) Inventor: Syam Kunjukrishnan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 381 days.

(21) Appl. No.: 17/403,566

(22) Filed: Aug. 16, 2021

(51) Int. Cl.
| | |
|---|---|
| *G06Q 10/0833* | (2023.01) |
| *G06N 20/00* | (2019.01) |
| *G06Q 10/0832* | (2023.01) |
| *G07C 9/00* | (2020.01) |
| *G07C 9/37* | (2020.01) |
| *G07C 9/38* | (2020.01) |

(52) U.S. Cl.
CPC ......... *G06Q 10/0833* (2013.01); *G06N 20/00* (2019.01); *G06Q 10/0832* (2013.01); *G07C 9/00896* (2013.01); *G07C 9/37* (2020.01); *G07C 9/38* (2020.01); *G07C 2009/0092* (2013.01)

(58) Field of Classification Search
CPC ............. G06Q 10/0832; G06Q 10/083; G06Q 10/0833
See application file for complete search history.

(56) References Cited

U.S. PATENT DOCUMENTS

| | | |
|---|---|---|
| 7,002,472 B2 | 2/2006 | Stratmoen et al. |
| 7,098,793 B2 | 8/2006 | Chung |
| 7,482,928 B2 | 1/2009 | Brackmann et al. |
| 7,714,708 B2 | 5/2010 | Brackmann et al. |
| 8,078,507 B1 | 12/2011 | Rao et al. |
| RE43,990 E | 2/2013 | Golden |
| 8,370,187 B2 | 2/2013 | Hilbush et al. |
| 9,959,727 B2 | 5/2018 | Fadell et al. |
| 10,679,173 B2 | 6/2020 | Olsen et al. |

(Continued)

FOREIGN PATENT DOCUMENTS

| | | |
|---|---|---|
| EP | 1535254 B1 | 4/2011 |
| EP | 3122201 A2 | 2/2017 |

(Continued)

OTHER PUBLICATIONS

LogiChain Solutions, "Tracking Shipments with IoT," logichainsolutions.com, Oct. 8, 2018, Retrieved from https://www.logichainsolutions.com/post/tracking-shipments-with-iot (Year: 2018).*

*Primary Examiner* — Rupangini Singh
*Assistant Examiner* — Bryan J Kirk
(74) *Attorney, Agent, or Firm* — Perkins Coie LLP

(57) ABSTRACT

A portable device augments a shipping container with security and communications capabilities. The device includes multiple sensors, communications circuitry, and other electronic circuitry and/or mechanical components. The device can determine, based on output of the multiple sensors, an anomalous event experienced by the shipping container relative to an expected activity and communicate an indication of the anomalous event over a wireless network to a remote computer. The device also performs an action in response to the anomalous event or based on a command received from the remote computer.

17 Claims, 5 Drawing Sheets

(56) References Cited

U.S. PATENT DOCUMENTS

| | | |
|---|---|---|
| 2003/0046589 A1 | 3/2003 | Gregg |
| 2005/0011945 A1 | 1/2005 | Williams et al. |
| 2005/0195975 A1 | 9/2005 | Kawakita |
| 2006/0033616 A1 | 2/2006 | Silva et al. |
| 2007/0050871 A1 | 3/2007 | Mashhour |
| 2010/0333175 A1 | 12/2010 | Cox et al. |
| 2014/0329497 A1 | 11/2014 | Sanzgiri et al. |
| 2016/0042317 A1* | 2/2016 | Goodman .......... G06Q 10/0833 705/341 |
| 2017/0091707 A1 | 3/2017 | Akselrod et al. |
| 2017/0091711 A1 | 3/2017 | Akselrod et al. |
| 2018/0253954 A1 | 9/2018 | Verma |
| 2018/0341911 A1 | 11/2018 | Daoura et al. |
| 2019/0236527 A1 | 8/2019 | Bhaumik et al. |
| 2020/0051015 A1* | 2/2020 | Davis ................. G06Q 10/0833 |
| 2020/0151780 A1 | 5/2020 | Cao et al. |
| 2020/0242549 A1 | 7/2020 | Daoura et al. |
| 2021/0012275 A1 | 1/2021 | Song |
| 2021/0037357 A1 | 2/2021 | Klein |
| 2021/0082078 A1 | 3/2021 | Vu |
| 2022/0063901 A1* | 3/2022 | Hyatt ................... G06Q 10/087 |
| 2022/0129829 A1* | 4/2022 | Pourteymour ..... G07C 9/00182 |

FOREIGN PATENT DOCUMENTS

| | | |
|---|---|---|
| WO | 0046728 A2 | 8/2000 |
| WO | 0195266 A2 | 12/2001 |
| WO | 2004022434 A2 | 3/2004 |
| WO | 2013084242 A2 | 6/2013 |
| WO | 2014124612 A2 | 8/2014 |
| WO | 2015147995 A1 | 10/2015 |
| WO | 2015148578 A2 | 10/2015 |
| WO | 2016094492 A1 | 6/2016 |
| WO | 2016109838 A1 | 7/2016 |
| WO | 2016155676 A1 | 10/2016 |
| WO | 2017010956 A1 | 1/2017 |
| WO | 2018208046 A2 | 11/2018 |

\* cited by examiner

SMART-SHIPPING CONTAINER WITH SECURITY AND COMMUNICATIONS CAPABILITIES

BACKGROUND

Smart objects are products, assets, and other things embedded with processors, sensors, software, and connectivity that allow data to be exchanged between themselves and their environment, manufacturer, operator/user, and other products and systems. Also known as smart-connected products/things, smart objects therefore enhance their interactions with both people and other smart objects. Connectivity also enables some capabilities of the product to exist outside the physical device, in what is known as the product cloud. The data collected from these products can then be analyzed to inform decision-making, enable operational efficiencies, and continuously improve the product's performance. In particular, a physical object is considered "smart" if it is active, digital, networked, can operate to some extent autonomously, is reconfigurable, and/or has local control of the resources it needs such as energy, data storage, etc.

A smart device is an electronic device, generally connected to other devices or networks via different wireless protocols (e.g., Bluetooth, Zigbee, NFC, WiFi, LiFi, 5G), that can operate to some extent interactively or autonomously. Several notable examples of smart devices include smartphones, smart vehicles, smart thermostats, smart doorbells, smart locks, smart refrigerators, phablets and tablets, smartwatches, smart bands, and smart keychains. Smart devices are typically composed of a hardware layer (which can include a wireless communication system), a network layer (through which devices communicate with each other), and an application layer (through which end users deliver commands). A collection of smart devices can form a smart environment, which links computers and other smart devices to everyday settings and tasks.

BRIEF DESCRIPTION OF THE DRAWINGS

Detailed descriptions of implementations of the present invention will be described and explained through the use of the accompanying drawings.

Figure 1:
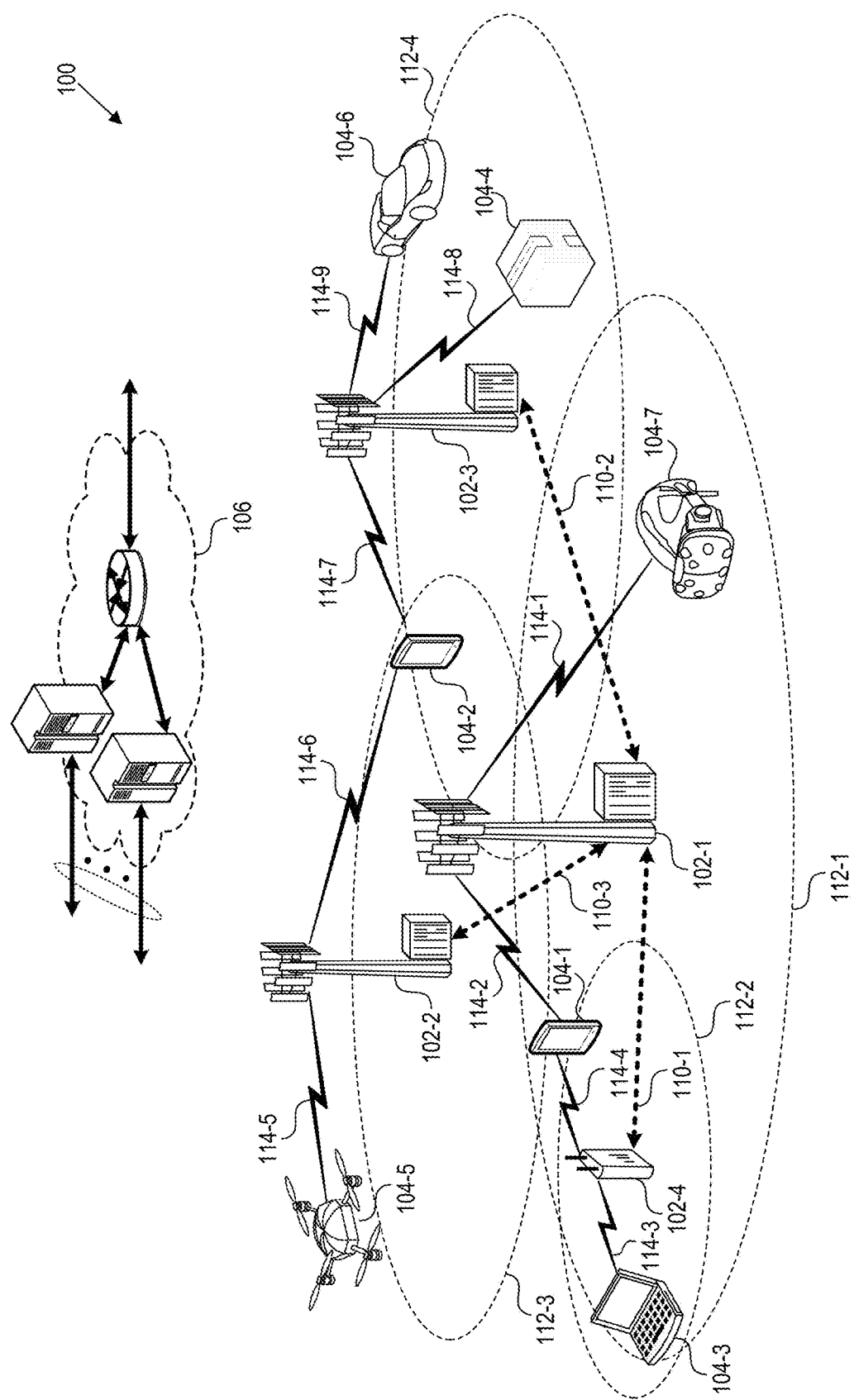
FIG. 1 is a block diagram that illustrates a wireless communications system including a smart container.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a smart container for shipping a package. The smart container (also referred to herein as a "shipping container") employs a combination of electronic, mechanical, and/or communications components. The combination enables improved routing and delivery of the smart containers, which are monitorable in real-time or near real-time by authorized entities. The smart containers include security capabilities such as authentication mechanisms to monitor whether unauthorized or authorized entities are handling the smart containers or attempting to access their content.

The smart containers can utilize packaging technology to enclose and protect goods as packages contained therein for storage and shipment, and expand the capabilities of delivery services of postal systems, express mail services, private courier companies, and less-than-truckload shipping carriers. Alternatively, the smart containers enable shipping-service agnostic shipping and can function independent of persons or resources affiliated with any commercial shipping service. The disclosed technology mitigates loss of the smart container while in transit, and mitigates against smart containers being stolen, tampered with, or damaged despite being shipping-service agnostic, and ensures that the smart containers can only be opened by intended recipients. The smart containers include communications capabilities that are realized via Internet connectivity through a cellular network or, alternatively, achieved via Bluetooth, Near-Field Communication (NFC), Wi-Fi, etc., in other settings.

In an example implementation, a smart container includes mechanical devices that can rectify problems that occur during shipping or delivery. This is particularly important if the items being shipped are fragile because they would need to be handled with care and perhaps also remain upright while being transported. For example, mechanical actuators embedded in a smart container can return the package to an upright position after impact and/or rotation. The actuators can function autonomously based on data generated locally by orientation sensors, or they could respond to commands communicated wirelessly over a communications network from a remote management system.

In another implementation, a smart container includes a temperature-control or air-conditioning system that can cool down or dehumidify a smart container's contents (to some extent) in response to a local sensor measuring temperature or humidity outside a desired range. Thus, the smart containers can activate temperature control mechanisms as needed to maintain the contents at a desired temperature. This is particularly important when, for example, perishable items cannot be exposed to temperatures and/or humidity levels beyond a prescribed range while being shipped.

Thus, the smart containers can perform at least three functions: (1) generate status data including monitoring an environment (e.g., location, temperature, physical position, or orientation); (2) communicate status data in real-time or near-real time to authorized parties (e.g., sender, recipient, shipping management service, law enforcement); and (3) perform actions in response to the status data to remedy detected issues, such as activating actuators or a temperature control system.

The smart containers enhance logistical convenience and reliability in a variety of delivery settings, including returns, exchanges, trade-ins, repairs, etc. Moreover, the smart containers are compatible with both manual, human-based delivery as well as automated delivery services that use drones or other types of robots, for example. Although the possible use cases are quite numerous and broad in scope, a few representative embodiments are described below.

In one example, a telecommunications company can use smart containers to ship smartphones to consumers by employing conventional shipper services, cross-shipper services, or shipper-independent resources while still safeguarding against being stolen, tampered with, lost, or misrouted and additionally provide same hour delivery. In another example, a consumer can conveniently use a smart container to return, exchange, or trade-in a smartphone. For example, the telecommunications company can send a smart container to the consumer, which can use any driver to transport a smartphone in the smart container to a local store affiliated with the telecommunications company.

A package can be locked in a smart container and is inaccessible without valid authorization. For example, the smart container can have a door that enables access to the package when opened and prohibits access when closed locked. The lock can be electronically controlled and operable to lock/unlock via a number pad or touch screen on the smart container. The smart container can include a biometric sensor that permits access to the package when a biometric scan (e.g., face detection, fingerprint) matches a stored biometric scan of an authorized recipient. For example, the smart container can include an external camera that is capable of scanning human faces and a GPS sensor that is used to determine the location of the smart container. The smart container could unlock itself only if a facial scan of the person handling/holding the container matches a facial scan of the intended recipient and/the recipient enters a correct passcode, and/or the facial scan and/or passcode were received by the smart container at a location determined by the GPS to be within a threshold range of an intended destination location and within a threshold time.

In another example, a smart container is equipped with a communications device that uses GPS and cellular/Internet connectivity to report its location in real-time or near real-time to both the sender and the recipient. This would be particularly useful for packages that would otherwise be lost in transit due to logistical errors or intentional sabotage. Similarly, smart containers that are stolen-either in route or after arrival at the intended destination-could report their location to authorized entities, including the sender, the recipient, and/or law enforcement.

In another example, a smart container is equipped with sensors and circuitry that detect when the package is being intentionally tampered with. The container could further use cellular connectivity to notify law enforcement when this occurs, thereby serving as a security measure by countering and deterring attempts at theft. Other security features could also be included, such as a motion detector coupled to an external camera that automatically activates and captures a photograph/video of a person tampering with or attempting to steal the smart container.

Other examples include smart containers that are equipped with a variety of sensors-thermometers for measuring temperature, scales for measuring weight, humidity sensors for measuring humidity, accelerometers for measuring movement, gyroscopes for measuring rotation, impact sensors for detecting impact and physical shock, etc.—which would enable monitoring details about the status/condition of a smart container and communicating those details to relevant parties when needed. The sensors can monitor properties and communicate the measurements on-demand or at regular intervals to a remote computing device using that data to continually update a mobile application and/or a computer of the recipient, sender, and/or a centralized shipping-management system with status updates.

In an example, smart containers are standalone devices that are configured to autonomously initiate or terminate a protocol in response to input detected at the smart container. The protocol can include communicating data via a wireless interface. A protocol can be triggered, for example, upon leaving a shipping company or arriving at an intended destination or intermediate locations. Furthermore, this functionality can be generalized into a process including programming the smart container with a manifest of intermediate locations it needs to pass through to get to a destination. For example, the smart container can include a scanner that scans a barcode or is physically tapped at each designated location along a route, causing the smart container to generate and communicate a signal that apprises a centralized management system with status updates.

This aforementioned functionality is a paradigm shift for shipping and delivery—specifically, a decentralized one, which could become a part of the gig economy, for example. That is, a single smart container could be handled and processed by multiple, independent shippers instead of a single, centralized delivery service like FedEx or UPS. Based on the foregoing discussion, the disclosed technology can be conceptualized as not only being capable of enhancing the security and reliability of services provided by traditional shipping services that manage their own manifests (e.g., USPS, FedEx, UPS)—but also enable decentralized (e.g., gig economy-based) shipping services which can execute manifests provided by someone other than the entities that provide the decentralized shipping service. In other words, the shipper-independent-shipping is enabled by effectively automating portions of the logistics and supply-chain management that are currently handled exclusively by shipping services.

The disclosed technology can include a centralized management component of a shipping system. A smart container is identifiable by the system using a unique identifier, through which the system also communicates with the container (in the sense of knowing, e.g., which of multiple active containers to transmit which command(s) to). The unique identifier can be registered with the system upon activation, registration, or initiation operation. Implementations could also feature different power-management and energy-storage systems, including batteries, solar cells, or wireless charging capabilities that are managed to ensure that critical components of the smart container remain energized over other components, depending on current circumstances or the status of the smart container.

The description and associated drawings are illustrative examples and are not to be construed as limiting. For example, although this disclosure focuses on examples of technology integrated in smart containers, other examples include devices that can be included inside any container to convert a non-smart container into smart containers. Likewise, although the disclosure focuses on examples of reusable smart containers, the use of disposable containers that integrate or hold smart-enabling technologies are within the scope of the disclosed technology. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless communications system including an enhanced hazard detection device. As shown, a wireless telecommunication network 100 ("network 100") includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), an smart device such as smart container 104-4. A wireless device can be included in another device such as, for example, a drone (e.g., wireless device 104-5), a device in a vehicle (e.g., wireless device 104-6), an augmented reality/virtual reality (AR/VR) device such as a head-mounted display device (e.g., wireless device 104-7), a wearable device such as a smartwatch, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Shipping System for Smart Containers

Figure 2:
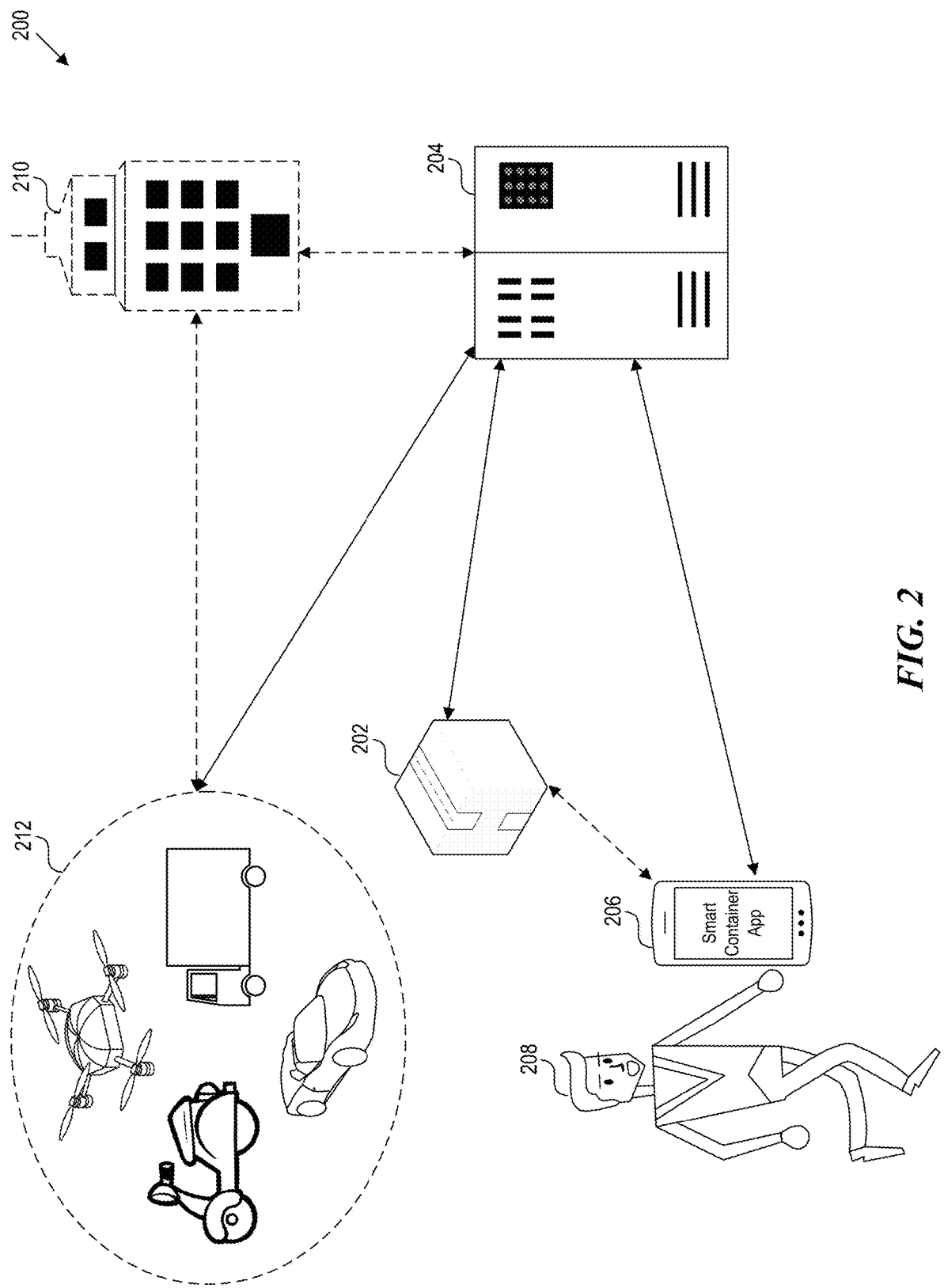
FIG. 2 is a diagram that illustrates a system for shipping a smart container.

FIG. 2 is a diagram that illustrates a system 200 for shipping a smart container 202. As shown, the system 200 includes components that are interconnected over one or more networks illustrated solid/dashed arrows. The networks may include any combination of private, public, wired, or wireless portions. The data or information communicated over the networks may be encrypted or unencrypted at various locations or along different portions of the networks.

Each component of the system 200 can include combinations of hardware and/or software to process data or information, perform functions, communicate over the networks, and the like. For example, any component of the system 200 may include a processor, memory or storage, a network transceiver, a display, operating system (OS) and application software (e.g., for providing a user interface), and the like. Other components, hardware, and/or software included in the system 200 that would be well known to persons skilled in the art are not shown or discussed herein for the sake of brevity.

The smart container 202 is a standalone portable device illustrated as a box that can hold a package, which is an object or group of objects typically wrapped in paper, plastic, or otherwise packed inside the smart container 202. For example, the smart container 202 can correspond to a cardboard box for shipping a newly purchased smartphone to a customer. A smart container can have any shape or size (e.g., rectangle, cylinder, envelope) and can be formed of rigid, semi-rigid, or deformable materials (e.g., cardboard, plastic, wood) that are weather resistant and secure the package of the smart container 202 during shipping and delivery.

The smart container 202 can implement a combination of at least some electronic components (e.g., sensors), mechanical components (e.g., actuators), or communications components (e.g., transceivers) that are at least partially embedded in its walls to enable monitoring, security, and other functions. As such, the smart container 202 is reusable by an entity (e.g., person or organization) for shipping different packages at different times and to different locations. Integrating components into the smart container 202, such as a keypad or camera on a surface of a wall, allows for additional security functions.

In another example, the smart container 202 is a typical disposable container (e.g., cardboard box) that is converted into a "smart" container when including the electronic, mechanical, and/or communications components as a bundled package (e.g., module) placed inside the disposable container along with the package being shipped from a sender to a recipient. As such, the bundled package is a standalone device that can be placed inside any standard shipping container to convert that standard shipping container into a smart container.

The smart container 202 can communicate with a management component 204 over networks. The management component 204 can be a component of a shipping service that executes on any number of server computers that operate to perform processes such as collecting sensor data in real-time from the smart container 202 and analyze the sensor data to determine the status of the smart container 202 (e.g., based on outputs of sensors of the smart container 202).

The management component 204 can operate as a service that independently supports multiple parties (e.g., senders, recipients, carriers) involved in shipping multiple smart containers. The smart container 202 can communicate status update data to the management component 204, which can issue commands to the smart container 202. The management component 204 can store algorithms configured to support shipping and delivery of numerous smart containers. For example, a shipping algorithm may include a combination of rules for selecting a suitable route and enable monitoring and security features for a particular smart container. A set of rules of a delivery algorithm can personalize delivery for a recipient to, for example, require authentication of the person opening or handling the smart container 202. A set of rules for a shipping algorithm designate certain persons for handling or transporting the smart container 202 to a destination. For example, a set of rules of the shipping algorithm can select only persons who are registered with the management component 204 to participate in carrying the smart container 202 to a next location along a shipping route.

In some embodiments, any of the disclosed algorithms may include policies having rules, criteria, conditions, and/or thresholds that are set by a sender/recipient to apply the policies in a manner that is personalized for the sender/recipient. For example, a shipping algorithm may include a rule set based on a recipient's preferred route and/or persons transporting the smart container 202 between two locations. Another delivery algorithm can specify preferred authentication measures such as biometric authentication. Thus, the management component 204 can execute a different set of rules for different smart containers or the same set of rules for the same parties (e.g., the same shipping and delivery preferences are applied for the same sender or recipient). Alternatively, the shipping and delivery algorithms can include the same set of rules that are applied in the same way to different parties.

The management component 204 can communicate with a mobile application ("app") running on a mobile device 206, which can be used by the user 208 to communicate with the management component 204 regarding the smart container 202. For example, the user 208 of the mobile device 206 can setup a shipping manifest for the smart container 202. As such, the management component 204 can send updates to the mobile app on the mobile device 206. The mobile device 206 is an example of a computing device that can interact with the system 200. Examples include smartphones, tablet computers, personal computers, and any other device that is capable of exchanging data with the management component 204 over the networks. In some embodiments, the app of the mobile device 206 can communicate directly with the smart container 202 to implement security and tracking capabilities, etc.

The system 200 can optionally include a shipping company 210 that can communicate with the management component 204 over networks. Examples of the shipping company 210 range from large delivery services companies (e.g., FedEx, UPS) that use trucks, railroads, or aircraft to smaller courier companies that operate within specific towns or regions and use bicycles, motorcycles, or drones. In general, commercial services include a distributed network of delivery vehicles that are managed under a common central service provider. As such, shipping a delivery of a package is relatively rigid and requires transport only by vehicles that are controlled by or agents of the shipping service. Thus, the shipping company 210 can use shipper-independent-shipping protocols deployed by the management component 204 as part of its shipping capabilities or extend shipping capabilities to include agents such as ride sharing services or any unaffiliated driver.

The system 200 includes delivery vehicles 212 that can communicatively couple to the management component 204 over networks. Examples of the delivery vehicles 212 include a truck, car, motorcycle, drone, or any other vehicle or device capable of transporting the smart container 202 from a source location to a destination. The delivery vehicles 212 may be affiliated or unaffiliated with the shipping company 210. For unaffiliated delivery vehicles, drivers can register with the management component 204. The users registered with the management component 204 can select delivery vehicles for shipping a particular smart container 202 or allow the management component 204 to select one or more drivers based on algorithms that optimize for routes and ratings of drivers.

In one example, the smart container 202 can autonomously initiate or terminate a protocol in response to input detected at the smart container 202. A protocol can include autonomously communicating certain data via a wireless interface and over networks to the management component 204. In one example, a protocol is triggered in response to detecting that the smart container 202 left the shipping company 210 or arrived at an intended destination or intermediate locations. This functionality can be implemented as a process including programming the smart container 202 with a manifest of geographic locations at expected points in time during shipping. In one example, the smart container 202 has a barcode scanner or other means used for identifying locations (e.g., including facilities tagged with barcodes). The smart container 202 can generate and communicate a signal that apprises the management component 204 when the smart container 202 is at a correct/incorrect location. In another example, the smart container 202 uses a biometric scan to identify a human transporter, an indication of which can be communicated to the management component 204 as a status update. In yet another example, the smart container can receive an input such as a physical tap on a touch screen at locations along a route, and likewise generate and communicate a signal that apprises the management component 204 of status updates based on the taps.

Security and Communications Capabilities

Figure 3:
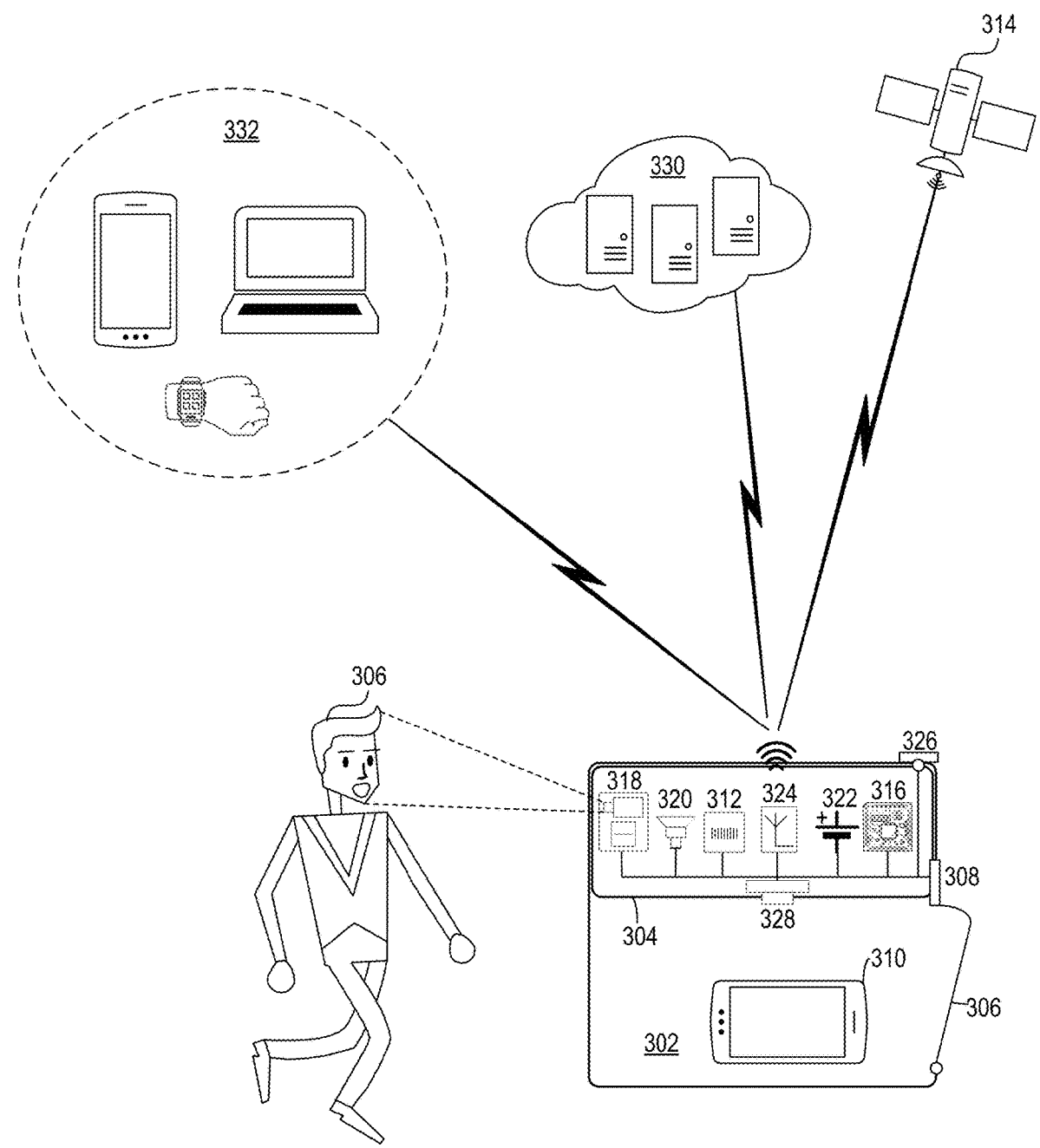
FIG. 3 is a diagram that illustrates security and communications capabilities of a smart container.

FIG. 3 is a diagram that illustrates security and communications capabilities of a smart container 302. The smart container 302 employs a combination of electronic, mechanical, and/or communications components (collectively referred to herein as "smart components 304") that support security and communications capabilities (collectively referred to herein as "smart capabilities"). Examples of the smart components 304 include combinations of circuitry, sensors, transducers, actuators, and transceivers. The security capabilities mitigate the risk of losing the smart container 302 while in transit, and the risk of the smart container 302 being stolen or tampered with. Thus, the smart components 304 operate to monitor that the smart container 302 is shipped to an authorized recipient and delivered at an expected location and within a range of time.

In one example, the smart container 302 has a door 306 with a mechanical lock 308 that is electronically controlled and can only be unlocked in response to input of an authorization code or biometric scan that matches an authorized recipient. Moreover, the smart container 302 can detect unauthorized persons handling the smart container 302 and take an action accordingly to mitigate loss or damage of its contents (e.g., package 310). Further, the communications capabilities of the smart container 302 enable communications of unauthorized events to devices of authorized persons (e.g., sender, recipient, shipping service, law enforcement).

The smart capabilities of the smart container 302 can introduce or expand functions of conventional shipping services or enable shipper-independent shipping that obviates the need for the conventional shipping services. As shown, the smart container 302 carries the package 310 (e.g., a smartphone) for transport from a sender to a recipient. The smart container 302 can be actively monitored, communicate status update messages in real-time or near real-time over a wireless network to authorized parties. In addition, the smart container 302 can perform one or more actions locally based on a detected anomalous event relative to expected activity. The smart container 302 can also receive and process commands over wireless networks from an authorized device. The commands can activate or deactivate local capabilities of the smart container 302 or change a shipping schedule, for example.

The smart components 304 can be bundled as a package of interconnected components that is separate and distinct from the smart container 302. The bundled package is then placed inside the smart container 302 along with the package 310. As such, the bundled package of components is reusable to place in different containers, which can be disposable or reusable. In another example, the smart components 304 are integrated into one or more structures (e.g., walls) of the smart container 302. As such, the smart container 302 is reusable along with (but not separate from) the smart components 304.

The smart components 304 include one or more sensors 312 that are each configured to detect, measure, and output sensor data indicative of one or more properties of the smart container 302 or affecting shipment thereof. Examples of the properties include movement, location, time, position, environment condition, weight, or any other indication of the status of the shipment. The sensor data can be used to determine an anomalous event that deviates from expected activity or non-anomalous activity such as an indication that the smart container 302 is in transit, delivered, and/or probably damaged.

Various non-limiting examples of the sensors 312 include an image sensor for capturing images, a biometric sensor for capturing a biometric scan to authenticate a person, a thermometer for measuring temperature, a scale for measuring a weight of the package 310, a humidity sensor that measures humidity inside or outside of the smart container 302, accelerometers for measuring a movement or impact, a gyroscope for measuring rotation, and a motion detector coupled to a camera that automatically activates to capture a photograph/video of a person tampering with or attempting to steal the smart container 302. The smart container 302 can include a global positioning system (GPS) sensor that receives positioning signals from GPS satellites 314 and use the positioning signals to determine the geographic location of the smart container 302 at a point in time.

The smart container 302 can communicate status messages to devices of authorized entities (e.g., sender, recipient, shipping service), and respond to sensor data by performing one or more actions. In one example, the smart container 302 detects that the package 310 is positioned in an undesired manner and responds by causing actuators to reposition the package 310 or the smart container 302. In another example, the smart container 302 has a mechanical lock that is electronically controlled to secure the package 310 during transit and can only be unlocked based on input that authorizes unlocking the smart container 302. The smart container 302 can have a keypad, touch screen, or biometric sensor (e.g., for face or fingerprint detection). The biometric sensor can capture and process a biometric scan to determine whether a person is authorized to unlock the smart container 302. Further, the GPS sensor is used to determine a location of the smart container 302 and point in time when the biometric scan was captured. If an authorized biometric scan was captured at an acceptable location and time, the smart container 302 unlocks. On the other hand, if any of these three factors does not match, the smart container 302 remains locked and can send a message to an authorized entity indicating that there is an attempt to tamper with the smart container 302.

The smart components 304 can determine potential intrusions by unauthorized persons, along with an unauthorized location and/or at an unauthorized time. For example, the smart components 304 include electronic circuitry 316 having a processor and memory that stores shipping instructions which, when executed by the processor, causes the smart container 302 to perform one or more operations. The electronic circuitry 316 can store the shipping instructions for the smart container 302. The shipping instructions can include route data such as locations at expected times, as well as data identifying persons that are authorized to open or handle the smart container 302 and/or required passcodes. The electronic circuitry 316 can process inputs and sensor data against that stored in a local memory to detect an anomaly indicative of an intrusion and determine the type of intrusion based on, for example, a locally stored intrusion detection model.

The smart components 304 can include an imaging device 318 (e.g., camera) configured to capture images external to the smart container 302. The imaging device 318 can optionally include or be coupled to a biometric sensor and/or motion sensor that triggers the imaging device 318 to capture images when the biometric sensor detects a person attempting to access the package 310 or the motion sensor detects someone handling or attempting to tamper with the smart container 302. The smart container 302 can send a message over a wireless network to an authorized device regarding whether an authorized or unauthorized person was handling the smart container 302. The content of the message can include an image or video of the person.

The smart components 304 can include an audio signal generator 320 configured to generate an audible alert in response to, for example, detecting an anomalous event relative to expected activity (e.g., unauthorized person, location, or time of access). The audio signal can also be used to locate the package. The smart container 302 includes a power source such as a battery 322 that powers the smart components 304. Embodiments could also feature different power-management and energy-storage systems, including solar cells or battery charging capabilities that are managed to ensure that critical components of the smart container 302 remain energized over non-critical components. The charging capabilities can include wired charging capabilities such that a person handling the smart container 302 can readily charge the battery 322 by plugging it into a USB port. The smart container 302 can include wireless charging capabilities for wireless charging stations on delivery vehicles.

The electronic circuitry 316 can include a power management controller configured to manage power to the smart components 304 and prioritize power for smart components 304 that are critical to securing the smart container 302, especially when an anomalous event is detected. For example, power can be allocated to provide more frequent status updates to an authorized device upon detecting that the smart container 302 has been tampered with, lost, or stolen. The power can also be dynamically allocated based on an amount of power available from power sources. For example, when available power drops below a threshold amount, the power management controller can disable non-essential sensors, place them in sleep mode, or reduce the frequency by which they actively operate to generate sensor data. As such, the power management controller can adapt the smart container 302 to dynamically reallocate power away from certain components and toward other components at different times, throughout a shipping process, depending on changing conditions or circumstances.

The smart container 302 can respond to anomalous events autonomously or in response to commands from a remote system. For example, the smart container 302 can include mechanical devices 326 (e.g., hydraulic pumps, actuators) that address and rectify problems that occur during shipment and delivery. This is particularly important if the items being shipped are fragile, which would need to be handled with care and perhaps also remain upright while being transported, or after impact and/or rotation. In another example, the smart container 302 enables automatic temperature-control element 328 to moderate a temperature or dehumidify the package 310 in response to a sensor measuring temperature or humidity outside a desired range. This is particularly important when, for example, perishable packages cannot be exposed to temperatures and/or humidity levels beyond a prescribed range while being shipped. In another example, the sensors 312 detect when the package 310 is being intentionally tampered with. In response, the communications circuitry 324 can use cellular connectivity to notify law enforcement, thereby serving as a security measure by countering and deterring attempts at theft. These actions can occur autonomously based on the data generated by sensors, or they could respond to commands communicated wirelessly over a communications network from a remote management device.

The communications circuitry 324 is configured to communicate status update messages that are based on sensor data. The communications circuitry 324 is also configured to receive data from computing devices authorized to do so. The communications circuitry 324 can include a transceiver and an antenna configured to exchange data between the smart container 302 and the cloud-based system 330 (e.g., administered by a shipping service) or other computing devices 332 (e.g., mobile phone, laptop, smartwatch) operated by authorized entities.

The communications circuitry 324 can couple the smart container 302 to one or more wired or wireless communications networks. Examples include a local area network (LAN), wide area network (WAN) such as the Internet, a telecommunications network (e.g., 5G), and the like. The communications circuitry 324 can also couple to computing devices that are proximate to the smart container 302 over WiFi, Bluetooth, Near-Field Communication (NFC), or using other communications protocols. The communications circuitry 324 can electronically latch the smart container 302 to an authorized device within range of its local network. For example, the smart container 302 can detect an authorized recipient's device within a range of its network and automatically latch to the recipient's device. Latching can cause the recipient's device to open an app that prompts the user for authenticating information required to unlock the smart container 302 and/or download tracking data.

In one example, the smart container 302 uses GPS signals and cellular/Internet connectivity to report its location in real-time to the sender, recipient, and/or management component. This is particularly useful for packages that would otherwise be lost in transit due to logistical errors or intentional sabotage. This is also extremely useful for shipping high value or sensitive items. Similarly, smart containers that are stolen-either in route or after arrival at the intended destination-could report their location to the relevant parties, including the sender, the recipient, and/or law enforcement. As such, the smart components 304 generate data that is processed to produce status updates, which the communications circuitry 324 can communicate to authorized devices including a centralized shipping-management system (e.g., the cloud-based system 330) and mobile applications running on computing devices of recipients or senders (e.g., end-user devices 332). The status updates can be communicated continuously, at regular intervals (e.g., periodically), or on-demand.

The communications circuitry 324 can also receive data communicated over the wireless networks from remote or local systems. For example, an authorized device can communicate a command for the smart container 302, which is processed with the electronic circuitry 316 to implement a setting or respond by providing a requested status update. In one example, a remote system can input sensor data to a centralized learning model in accordance with artificial intelligence or machine learning (ML) techniques to generate predictive feedback regarding whether an anomalous event is an actual problem (e.g., stolen or damaged package). The remote system can respond to the sensor data by sending a command to the smart container 302 regarding the determined problem. As such, the remote system can process anomaly data to disambiguate between actual problems and unexpected activity that is not problematic. This information is fed back to the smart container 302, which can use the information to perform or not perform a suitable action.

The centralized learning model can be trained based on anomaly data generated by multiple smart containers to improve the precision by which it predicts a problem while avoiding false positives. A smart container can be uniquely identified among other smart containers based on a unique identifier. The unique identifier can be generated or used to register the smart container with a service for monitoring its shipment. The unique identifier can be registered with the service upon some activation, registration, or initiation operation. In one example, a remote device can gain authorization to query the smart container 302 based on knowing its unique identifier. Moreover, the unique identifier can be used by the centralized server to initiate communication with the smart container.

Figure 4:
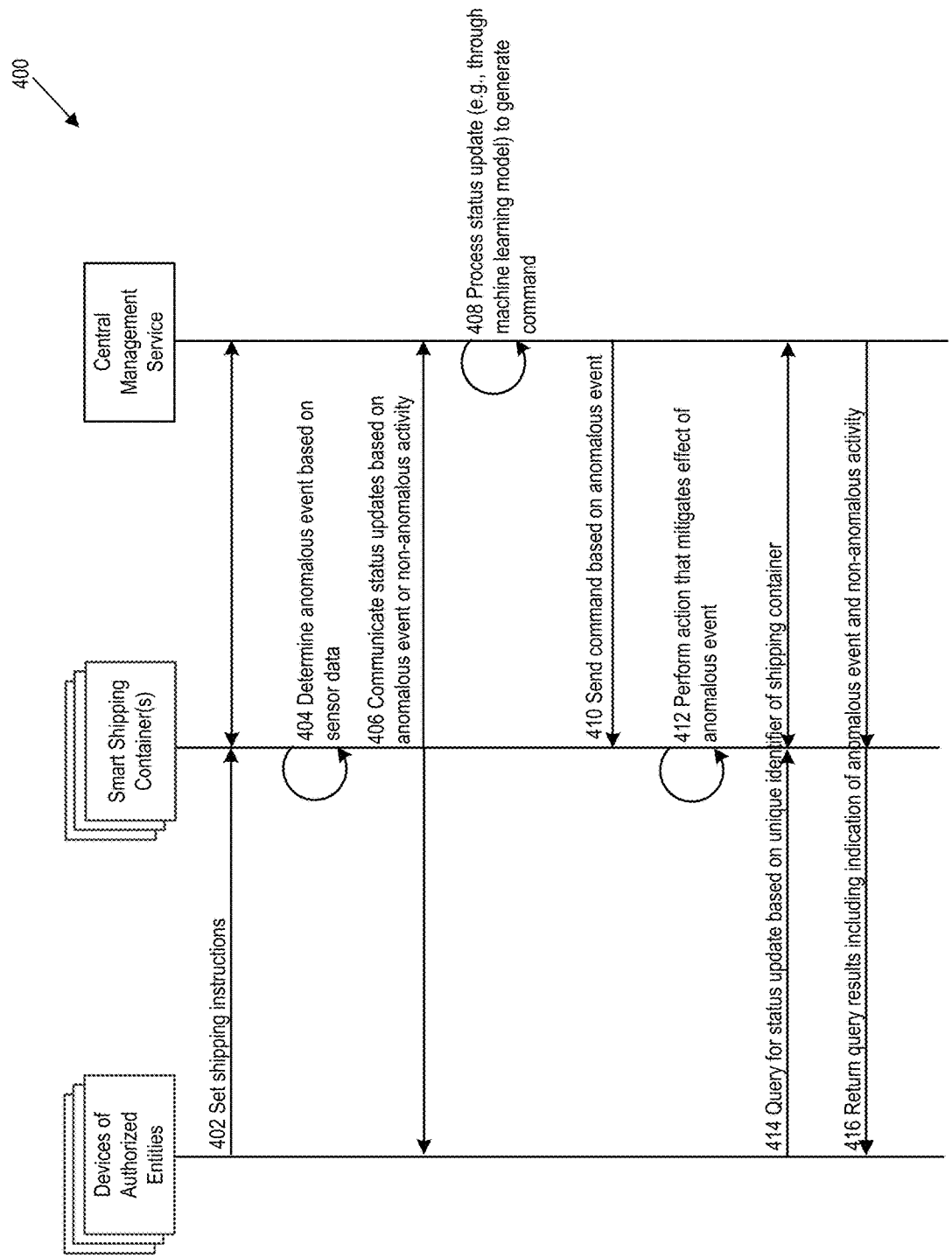
FIG. 4 is a flow diagram that illustrates processes to actively secure a smart container during transit and delivery.

FIG. 4 is a flow diagram that illustrates processes 400 to actively secure a smart container during transit and delivery. The smart container includes smart components that enable security and communications capabilities. In one implementation, the smart components are at least partially integrated into walls of the smart container that form an enclosed space. In another implementation, the smart components are bundled into a package (e.g., standalone portable module) that is separate and distinct from the smart container and placed inside the enclosed space. As shown, operations of the processes are performed by devices of authorized entities (e.g., senders, recipients, shipping services), the smart containers, or a remote server computer (e.g., of the centralized management service). Any of these devices includes at least one hardware processor, and at least one non-transitory memory storing shipping instructions, which, when executed by the at least one hardware processor, cause the device to perform the illustrated operations.

At 402, the smart container receives or is programed with shipping instructions, which can be shipper-service agnostic. For example, the smart container can receive the shipping instructions from the authorized devices or the central management service over a wireless network. The shipping instructions can indicate transport preferences of an entity other than a shipping company (e.g., sender, recipient). In another example, the shipping instructions indicate transport instructions set by a shipping company, where the transport instructions indicate transport resources that are affiliated with the shipping company.

At 404, the smart container determines an anomalous event experienced by the smart container relative to expected activity. The anomalous event is determined based on sensor data output from a combination of sensors included in the smart container. Examples include a motion sensor configured to detect movement of the smart container during transit or delivery, a location sensor (e.g., GPS sensor) configured to detect a location of the smart container at a point in time during transit or delivery, an environmental sensor configured to detect an environment condition relative to the shipping container, and a shock sensor (e.g., accelerometer) configured to detect a physical impact.

In one example, the smart container includes an authentication sensor (e.g., a biometric sensor). The biometric sensor can capture a biometric scan of a person handling the shipping container, compare the biometric scan to a reference scan stored at a local memory, and determine whether the current biometric scan matches the reference scan. As such, the anomalous event can indicate that a person handling the smart container is unauthorized to do so because the biometric scan does not match the reference scan.

In another example, the smart container can determine that an actual movement of the smart container deviated from an expected movement indicated in shipping instructions. The expected movement can be an absence of movement at a delivery address of a recipient of the shipping container, and the actual movement can include a movement away from the delivery address, for example.

In another example, the smart container determines that a current location of the smart container deviates from an expected location at an expected time in accordance with shipping instructions. The expected location can be along a shipping route at an expected point of time and the actual location would not include the expected location.

In one example, the smart container determines an actual environment condition that deviates from an expected environment condition as indicated in shipping instructions. The actual environment condition can be a temperature measurement or a humidity measurement greater than a threshold value.

At 406, the smart container communicates an indication of the anomalous event over the wireless network to remote computers including, for example, the central management service and the authorized devices. For example, the smart container includes communications circuitry configured to connect the device to remote computers over a wireless network. The communications circuitry can respond to determining the anomalous event by communicating the indication to relevant devices.

In one example, the smart container autonomously communicates status updates to a sender of the smart container, a recipient of the shipping container, a shipping service, and/or the central management service. The status updates can indicate non-anomalous activity at locations of the shipping route at different points in time. The status updates can be communicated in accordance with a predetermined schedule.

At 408, the central management service can process data indicative of a potential anomalous event with an ML model that can classify a smart container as lost, stolen, tampered with, or damaged. The ML model is trained based on anomalous activity and non-anomalous activity reported from multiple shipping containers. The central management service can generate a command for the smart container based on output of the ML model. The command can indicate whether the smart container is classified as lost, stolen, tampered with, or damaged. Further, the command causes the smart container to perform an action that mitigates an effect of being lost, stolen, tampered with, or damaged, as classified At 410, the smart container optionally receives the command sent from the central management service based on the indication of the anomalous event. As indicated earlier, the command can be generated based on output from the ML model that is trained based on data collected from multiple shipping containers. As such, the command causes the smart container to perform an action based on anomalous and non-anomalous activity learned from a network of shipping containers.

At 412, the smart container responds to the anomalous event by performing an action in accordance with shipping instructions. In some implementations, the action is based on the command received from the central management service in response to the indication of the anomalous event. In one example, the smart container includes an image sensor positioned to face away from the smart container and the action includes causing the image sensor to capture an image of a scene external to the smart container.

In another example, the smart container includes a power management circuit configured to dynamically allocate power among the smart components. As such, for example, the action can include causing the power management circuit to prioritize powering the communications circuitry to increase a frequency of communicating status update messages. In another example, the smart container includes an audio signal generator and the action includes causing the audio signal generator to generate an audible alert. In yet another example, the smart container includes an actuator that can reposition the smart container to a desired position. In another example, the smart container includes an electronic lock configured to secure a door of the smart container. To unlock the lock, the user must input authenticating data. As such, the action can include requiring additional input to authenticate the user.

The authorized entities can query the smart container or central management service for status updates on demand. For example, at 414, the smart container receives, from an authorized device, a query for a status update of the smart container. The query includes a unique identifier that differentiates the smart container from multiple smart containers. At 416, the authorized device receives query results indicating a status update including an indication of the anomalous event and/or indications of non-anomalous activity.

Computer System

Figure 5:
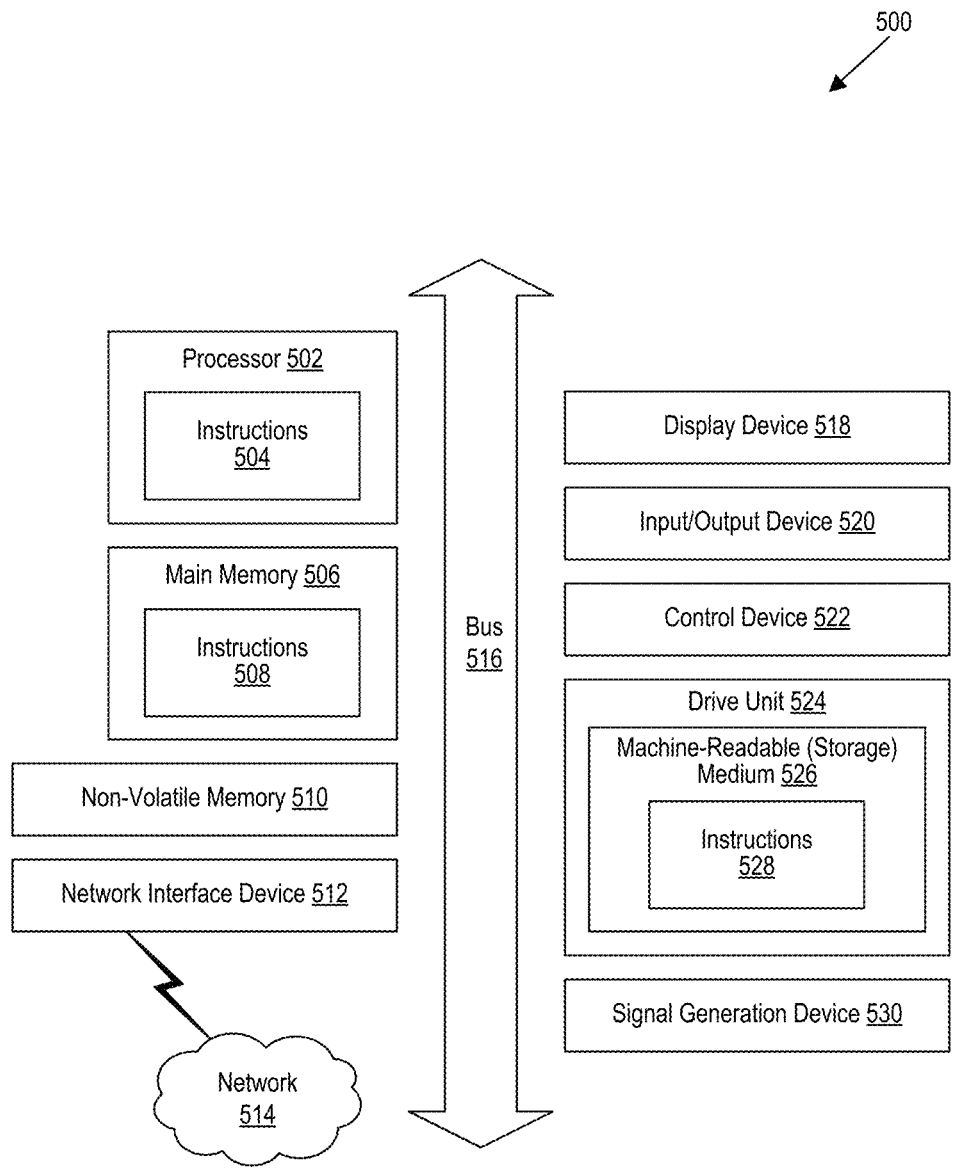
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 (e.g., smart containers 202, 302) can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A device that augments a shipping container with security and communications capabilities, the device comprising:
a combination of multiple sensors including:
a motion sensor configured to detect movement of the shipping container during transit or delivery,
a location sensor configured to detect a location of the shipping container at a point in time during transit or delivery,
an environmental sensor configured to detect an environment condition relative to the shipping container, or
a shock sensor configured to detect a physical impact experienced by the shipping container;
an actuator coupled to the shipping container;
communications circuitry configured to connect the device to a remote computer over a wireless network;
at least one hardware processor coupled to the combination of multiple sensors and to the communications circuitry; and
at least one non-transitory memory coupled to the at least one processor and storing shipping instructions, which, when executed by the at least one hardware processor, cause the device to:
determine an anomalous event experienced by the shipping container relative to expected activity, wherein the anomalous event is determined based on output of the multiple sensors;
cause the communications circuitry to communicate an indication of the anomalous event over the wireless network to the remote computer; and
in response to the anomalous event, perform one or more actions in accordance with the shipping instructions or based on a command received from the remote computer in response to the indication of the anomalous event,
wherein an action performed in response to the anomalous event includes activating the actuator to reposition the shipping container to a desired position.

2. The device of claim 1 further comprising:
an image sensor positioned to face away from the shipping container,
wherein another action performed in response to the anomalous event includes causing the image sensor to capture an image of a scene external to the shipping container.

3. The device of claim 1 further comprising:
a biometric sensor,
wherein the device is further caused to:
cause the biometric sensor to capture a current biometric scan of a person handling the shipping container,
compare the current biometric scan of the person to a reference scan of the person stored at the memory or remotely at a location accessible over the wireless network, and
determine whether the current biometric scan matches the reference scan; and
wherein the anomalous event indicates that the person is unauthorized because the current biometric scan does not match the reference scan.

4. The device of claim 1 further comprising:
a power management circuit configured to dynamically allocate power to the combination of multiple sensors and the communications circuitry,
wherein another action performed in response to the anomalous event includes causing the power management circuit to prioritize powering the communications circuitry to increase a frequency of communicating status update messages to the remote computer.

5. The device of claim 1 further comprising:
an audio signal generator,
wherein another action performed in response to the anomalous event includes causing the audio signal generator to generate an audible alert.

6. The device of claim 1 further caused to, prior to being caused to perform the action:
determine that an actual movement of the shipping container deviates from an expected movement indicated in the shipping instructions,
wherein the expected movement is an absence of movement at a delivery address of a recipient of the shipping container, and
wherein the actual movement includes movement away from the delivery address.

7. The device of claim 1 further caused to, prior to being caused to perform the action:
determine that a current location of the shipping container deviates from an expected location at an expected time in accordance with the shipping instructions,
wherein the expected location is a location along a shipping route for the shipping container at the expected time, and
wherein the current location does not include the expected location.

8. The device of claim 1 further caused to, prior to being caused to perform the action:
determine an actual environment condition that deviates from the expected environment condition as indicated in the shipping instructions,
wherein the actual environment condition is a temperature measurement or a humidity measurement greater than a threshold value.

9. The device of claim 1, wherein the shipping container has multiple walls that form an enclosed space, and wherein the device is at least partially integrated into one of the multiple walls, and wherein the shipping container is smaller than a standard ISO shipping container.

10. The device of claim 1, wherein the shipping container has multiple walls that form an enclosed space, and wherein the device is separate and distinct from the shipping container and placed inside the enclosed space.

11. The device of claim 1 further caused to, prior to performance of the action:
- receive, over the wireless network, the shipping instructions from the remote computer,
  - wherein the shipping instructions indicate transport preferences of an entity other than a shipping company; and
- cause the device to store and process the shipping instructions.

12. The device of claim 1, wherein the shipping instructions indicate transport instructions programmed by a shipping company, wherein the transport instructions indicate transport resources that are affiliated with the shipping company.

13. The device of claim 1 further caused to:
- communicate status updates to a sender of the shipping container, a recipient of the shipping container, and a shipping management entity,
  - wherein the status updates indicate detected locations of the shipping container at associated points in time, and
  - wherein the status updates are communicated to the remote computer in accordance with a schedule.

14. The device of claim 1 comprising:
- an electronic lock configured to secure a door of the shipping container,
  - wherein unlocking the electronic lock requires input by a user that authenticates the user, and
  - wherein another action performed in response to the anomalous event includes requiring an additional input by the user.

15. A method performed by a shipping container, the method comprising:
- determining an anomalous event experienced by the shipping container relative to an expected activity,
  - wherein the anomalous event is determined based on output of an accelerometer, a GPS sensor, and an authentication sensor of the shipping container;
- in response to the anomalous event:
  - communicating an indication of the anomalous event over a wireless network to a remote computer; and
  - performing one or more actions in accordance with shipping instructions to mitigate an effect of the anomalous event,
    - wherein the shipping instructions are stored at a local memory of the shipping container,
    - wherein the shipping instructions are shipper-service agnostic, and
    - wherein an action performed in response to the anomalous event includes activating an actuator coupled to the shipping container to reposition the shipping container to a desired position.

16. The method of claim 15 further comprising, prior to performing the action:
- receiving a command from the remote computer in response to the anomalous event,
  - wherein the command is generated based on output from a machine learning model that is trained based on data collected from multiple devices of multiple shipping containers,
  - wherein the action is performed based on the command received from the remote computer.

17. The method of claim 15 being performed autonomously in accordance with the shipping instructions, and wherein the shipping instructions are programmed by a sender or recipient of the shipping container.

* * * * *